Feb. 16, 1932.  N. B. SALERNI  1,845,343
IRRIGATOR VALVE
Filed Feb. 1, 1930  2 Sheets-Sheet 1
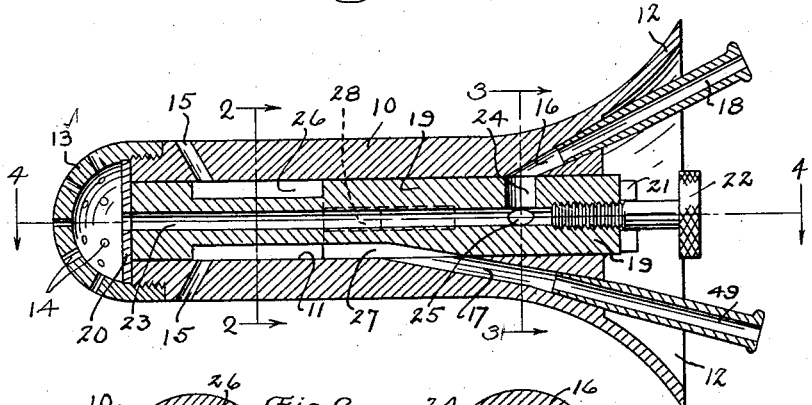
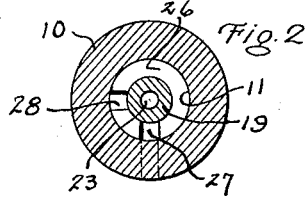
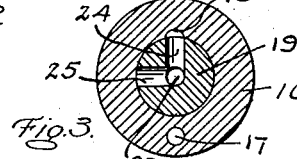
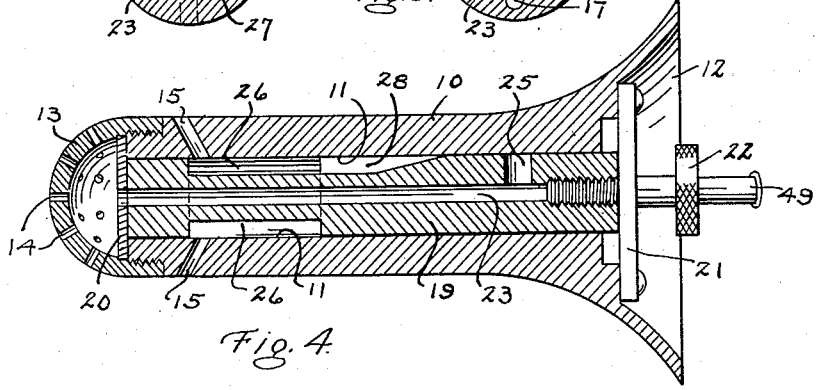
INVENTOR
Nicholas B. Salerni,
By Minturn & Minturn,
Attorneys.

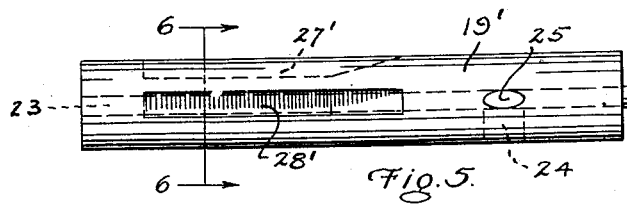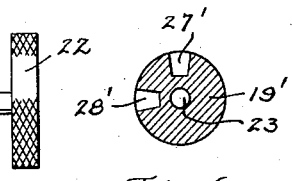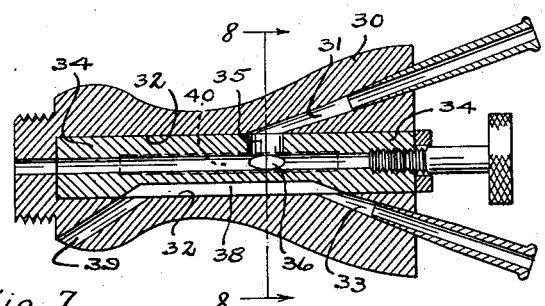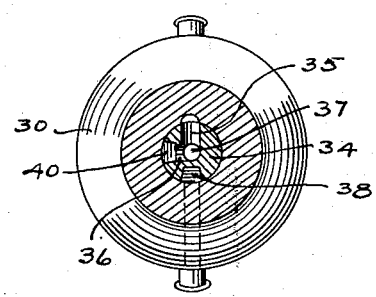

Patented Feb. 16, 1932

1,845,343

UNITED STATES PATENT OFFICE

NICHOLAS B. SALERNI, OF INDIANAPOLIS, INDIANA

IRRIGATOR VALVE

Application filed February 1, 1930. Serial No. 425,123.

This invention relates to the art of irrigators for cavities within the human body, and particularly to a valve mechanism for controlling the intake and discharge of fluids through the irrigator.

It is the primary purpose of my invention to provide a simple valve mechanism that may be directly incorporated in the head of an irrigator whereby a fluid may be selectively allowed to flow into the irrigated cavity and be retained therein; to have a continuous flow therein and a continuous drain out through a separate conductor; to have the flow cut off so that the fluid may be retained in the cavity without draining therefrom; or to have the incoming fluid shut off and to have a drainage conductor open. It is the further purpose of the invention to control all such flow arrangements by a simple rotary member easily operated from without the head.

A further purpose of the invention is to provide a valve structure within an irrigator head that may be readily cleaned and sterilized and that is adapted, by the simple expedient of changing tips for use in rectal, vaginal, or other tracts or cavities.

These and other objects will become apparent in the following description of the invention as illustrated by the accompanying drawings, in which—

Fig. 1 is a central, longitudinal section through an irrigator head embodying my invention;

Fig. 2, a transverse section on the line 2—2 in Fig. 1, through the head;

Fig. 3, a transverse section on the line 3—3 in Fig. 1;

Fig. 4, a central, longitudinal section on the line 4—4 in Fig. 1;

Fig. 5, a side elevation of a valve plug modified in form from that shown in Fig. 1;

Fig 6, a transverse section on the line 6—6 in Fig. 5;

Fig. 7, a central transverse section through a modified form of irrigator head; and Fig. 8, a transverse section on the line 8—8 in Fig. 7.

Like characters of reference indicate like parts throughout the several views in the drawings.

Referring to Figs. 1–4, I form an irrigator head 10 to be essentially cylindrical in form with a uniform central bore 11 axially therethrough, and a flared collar 12 at the rear or outer end. The front or inner end is screwthreaded to receive a tip 13, here shown as short and rounded and having a plurality of perforations 14 therethrough to communicate with the central bore 11.

A plurality of passages 15 here shown as four in number, are formed in the head 10 to enter just back of the tip 13 and to extend diagonally rearward to discharge into the bore 11 at points circumferentially therearound in the same transverse plane. At the rear end of the head 10, an intake passage 16 enters diagonally to discharge into the bore 11, and a drainage passage 17 also enters diagonally to discharge into the bore 11, in the same longitudinal plane as that including the passage 16, to have its orifice in the bore 11 located at a position nearer the tip 13 than is the orifice of the passage 16. Suitable hose connectors 18 and 49 are frictionally held in the passages 16 and 17.

A cylindrical valve plug 19 is rotatably fitted in the bore 11 to extend throughout the entire length thereof, and is here shown as being held within the bore by having its forward end abut the washer 20 and its rear end abut the bar 21 removably secured within the collar 12. A thumb screw 22 rotatably passes through the bar 21 and screw-threadedly engages the plug 19 so that the plug may be rotated by turning the screw 22.

The plug 19 is bored axially to have the central bore or passage 23 discharging from the forward end of the plug 19 through the washer 20 and into the tip 13. A passageway 24 is formed to extend through one side of the plug 19 at right angles to the central bore 23 to discharge therein, the passageway 24 being located in the plug 19 to have its intake orifice register with the discharge orifice of the intake passage 16 when the plug 19 is suitably rotated to the position as shown in Figs. 1–4. At right angles to and in the same plane with the passageway 24, Fig. 3, is a second passageway 25 through one side of the plug 19 discharging into the bore 23, which passageway 25 may be brought to communicate with the passage 16 upon rotating the screw 22 in a counter-clockwise direction as viewed from the collar end of the head 10.

The plug 19 has an annular groove 26 formed around it along a length removed from its inner end to provide a space into which all of the passages 15 may discharge. A longitudinal slot 27 is cut along a side of the plug 19 in the same plane as that of the passageway 24 but on the opposite side therefrom, and continues from the groove 26 back to and over the orifice of the drainage passage 17. A second slot 28 is cut longitudinally along the side of the plug 19 on the same side and in the same plane as that of the passageway 25 to provide a passageway from the groove 26. The outer end of the slot 28 terminates in the same transverse plane as that of the end of the slot 27.

The plug 19 as positioned in Fig. 1 is turned to permit fluid to flow from the intake passage 16, through the transverse plug passageway 24 into the plug bore 23 and out the tip 13 into the cavity being irrigated or treated. Also drainage from the cavity may be had by the fluid returning through the passages 15 into the annular groove 26, along the slot 27 and out the passage 17, thereby permitting a continuous irrigation. By rotating the screw 22 ninety degrees to bring the passageway 25 around to register with the passage 16, the fluid may still continue to flow from the passage 16 into the plug bore 23 and out the tip 13 but the slot 27 has been removed from communication with the drainage passage 17 and no discharge of the fluid is to be had from the groove 26. By revolving the screw 22 another ninety degrees in the same direction, the passageway 25 is removed from registry with the passage 16 and no fluid may then flow into the bore 23. The slot 28 has also been revolved, but no drainage may occur, the fluid still remaining in the cavity without further supply thereto or drainage therefrom.

Another ninety degree rotation of the screw 22 brings the slot 28 around to communicate with the passage 17 and thereby permit drainage therethrough, without any fluid from the passage 16 entering the plug bore 23. Further rotation of the plug 19 brings the passageway 24 back to the original position. The plug 19 may of course be rotated in either direction to any position to secure the flow desired.

Referring to Figs. 5 and 6, the valve plug 19' corresponds to the valve plug 19 in all respects with the exception that no annular groove 26 is formed thereon and the slots 27 and 28 are extended in length to form the slots 27' and 28' whereby the slots may register with the passages 15 in the head 10.

Figs. 7 and 8 show a modified structure. The head 30 here shown is relatively short in length as compared with the head 10. An intake passage 31 enters diagonally from the rear of the head 30 and discharges into a central bore 32. A drainage passage 33 also enters diagonally from the rear to discharge into the bore 32, but the orifice of the passage 33 in the bore 32 is back of the orifice of the passage 31. A valve plug 34 is rotatably carried in the bore 32, and has passageways 35 and 36 in the same transverse plane one entering the side of the plug at ninety degrees from the other to discharge into the central longitudinal bore 37 of the plug. In the same longitudinal plane of the passageway 35 is a longitudinal slot 38 along the outer side of the plug 34 having a length adapted to extend over the orifice of the discharge or drainage passage 33 and also over the orifice of the passage 39 which extends diagonally from the outside near the front of the plug to discharge into the bore 37 at a point forward of both orifices of the passages 31 and 33. The orifices of passages 31, 33 and 39 are in the same longitudinal plane. The forward end of the bore 37 may discharge through the end of the head 30. A longitudinal slot 40 is cut on the side of the plug 34 in the plane of the passageway 36 with its length equal to that of the slot 38, to have its ends terminate in the same plane therewith.

In the form shown in Figs. 7 and 8, the plug 30 is shown as positioned to permit a fluid flow from the passage 31, through the passageway 35, and the bore 37, out the front end of the head 30. At the same time drainage is had through the passage 39, the slot 38, and out the passage 33.

Revolving the plug 34 ninety degrees to bring the passageway 36 to register with the passage 31 permits a fluid flow from the passage 31, through the passageway 36, the bore 37 and out the front end of the head 30. No drainage is had since the single slot 38 is removed from the passage 33. A further ninety degree rotation of the plug 34 brings the plug 34 around to close off both intake and drainage passages 31 and 33. The next ninety degree rotation brings the slot 40 around to provide communication between the passage 39 and the drainage passage 33 to permit drainage without inflow of fluid from the passage 31. It is to be noted that, since the passageway 36 has the slot 40 passing over its outer end, drainage may also be had from through the front end of the bore 37, out the passageway 36, through the slot 40, and out the passage 33. The next ninety degree rotation returns the plug 34 to the position as indicated in Figs. 7 and 8.

While I have here shown and described my invention in minute detail, it is obvious that structural deviations may be made without departing from the spirit of the invention, and I, therefore, do not desire to be limited to that form, nor any more than may be required by the following claims.

I claim:

1. The combination with an irrigator head having a bore therein and intake and drainage passages communicating with the bore through respective orifices spaced apart along the bore, and having a forward passage also communicating with the bore through an orifice ahead of said other two orifices, of a valve plug rotatably carried in the bore of the head, said plug having a central longitudinal bore therein discharging at the front end of the plug, and having two transverse passageways entering from points on the side of the plug spaced circumferentially therearound to discharge into the plug bore, and said plug having a pair of longitudinal slots along its side having a length permitting them to afford communication therealong from the orifice of said forward passage to the orifice of said drainage passage and means for establishing communication between the slots at their forward ends comprising an annular groove into which the slots discharge.

2. The combination with an irrigator head having a bore therein and intake and drainage passages communicating with the bore through respective orifices spaced apart along the bore, and having a forward passage also communicating with the bore through an orifice ahead of said other two orifices, of a valve plug rotatably carried in the bore of the head, said plug having a central longitudinal bore therein discharging at the front end of the plug, and having two transverse passageways entering from points on the side of the plug spaced circumferentially therearound to discharge into the plug bore, and said plug having a longitudinal slot along its side having a length permitting it to afford communication therealong from the orifice of said forward passage to the orifice of said drainage passage, said slot being in the plane of one of said plug passageways, and the other of said plug passageways being in a plane at right angles to that of said slot plane, a second drainage slot similar to the first and an annular groove in the plug with which the slots communicate.

3. The combination with an irrigator head having a bore therein and intake and drainage passages communicating with the bore through respective orifices spaced apart along the bore, and having a forward passage also communicating with the bore through an orifice ahead of said other two orifices, of a valve plug rotatably carried in the bore of the head, said plug having a central longitudinal bore therein discharging at the front end of the plug, and having two transverse passageways entering from points on the side of the plug spaced circumferentially therearound to discharge into the plug bore, and said plug having a longitudinal slot along its side having a length permitting it to afford communication therealong from the orifice of said forward passage to the orifice of said drainage passage, and said plug having a second longitudinal slot parallel to and equal in length to said first slot and communicating means between the forward ends of the two slots comprising an annular groove intercepting the slots.

4. The combination with an irrigator head having a bore therein and intake and drainage passages communicating with the bore through respective orifices spaced apart along the bore, and having a forward passage also communicating with the bore through an orifice ahead of said other two orifices, of a valve plug rotatably carried in the bore of the head, said plug having a central longitudinal bore therein discharging at the front end of the plug, and having two transverse passageways entering from points on the side of the plug spaced circumferentially therearound to discharge into the plug bore, and said plug having a longitudinal slot along its side having a length permitting it to afford communication therealong from the orifice of said forward passage to the orifice of said drainage passage, said slot being in the plane of one of said plug passageways, and the other of said plug passageways being in a plane at right angles to that of said slot plane, and said plug having a second longitudinal slot parallel to and equal in length to said first slot and communicating means between the forward ends of the two slots comprising an annular groove intercepting the slots.

5. The combination with an irrigator head having a bore therein and intake and drainage passages communicating with the bore through respective orifices spaced apart along the bore, and having a forward passage also communicating with the bore through an orifice ahead of said other two orifices, of a valve plug rotatably carried on the bore of the head, said plug having a central longitudinal bore therein discharging at the front end of the plug, and having two transverse passageways entering from points on the side of the plug spaced circumferentially therearound to discharge into the plug bore, and said plug having a longitudinal slot along its side having a length permitting it to afford communication therealong from the orifice of said forward passage to the orifice of said drainage passage, said slot being in the plane of one of said plug passageways, and the other of said plug passageways being in a plane at right angles to that of said slot plane, and said plug having a second longitudinal slot parallel to and equal in length to said first slot, said second slot being in the plane of and on the same side as said other plug passageway.

6. The combination with an irrigator head having a bore therein and intake and drainage passages communicating with the bore through respective orifices spaced apart along the bore, and having a forward passage also communicating with the bore through an orifice ahead of said other two orifices, of a valve plug rotatably carried in the bore of the head, said plug having a central longitudinal bore therein discharging at the front end of the plug, and having two transverse passageways entering from points on the side of the plug spaced circumferentially therearound to discharge into the plug bore, and said plug having a longitudinal slot along its side having a length permitting it to afford communication therealong from the orifice of said forward passage to the orifice of said drainage passage, and said plug having a second longitudinal slot parallel to and equal in length to said first slot, said plug having an annular groove around its forward part into which said forward passage may discharge and intercept said slots.

In testimony whereof I affix my signature.

NICHOLAS B. SALERNI.